United States Patent [19]

Aldridge, Jr.

[11] 4,132,494
[45] Jan. 2, 1979

[54] ALIGN BORING MACHINE

[76] Inventor: Rufus W. Aldridge, Jr., 10022 Nadina Dr., Huntsville, Ala. 35803

[21] Appl. No.: 875,985

[22] Filed: Feb. 8, 1978

[51] Int. Cl.² .................................. B23B 41/12
[52] U.S. Cl. .................................. 408/54; 408/708; 269/73
[58] Field of Search ............... 408/54, 36, 69, 234, 408/708; 90/18; 269/71, 73

[56] References Cited

U.S. PATENT DOCUMENTS

| | | | |
|---|---|---|---|
| 1,585,026 | 5/1926 | Green | 408/708 X |
| 1,698,862 | 1/1929 | Wadell | 408/708 X |
| 2,010,157 | 8/1935 | Johnson et al. | 408/36 |
| 2,160,476 | 5/1939 | Kampmeier | 408/708 X |
| 2,401,838 | 6/1946 | Mitchell | 408/54 |
| 2,413,574 | 12/1946 | Mitchell | 408/54 X |
| 2,416,402 | 2/1947 | Mitchell | 408/54 |
| 3,926,422 | 12/1975 | Wilson | 269/71 X |

Primary Examiner—Horace M. Culver
Attorney, Agent, or Firm—C. A. Phillips

[57] ABSTRACT

An align boring machine for boring bearing housings of an automotive engine block wherein a boring bar is rotably suspended by and rotably driven between two columns positioned upon machine ways, and the engine block is mounted for aligned movement along said ways.

3 Claims, 2 Drawing Figures

ALIGN BORING MACHINE

BACKGROUND OF THE INVENTION

1. Field of the Invention

This invention relates to the field of remachining automotive engines, and particularly to a machine for align boring main and cam bearing housings.

2. General Description of the Prior Art

There are several machines being marketed for the align boring of bearing housings of automotive engines. Commonly, they are constructed to provide a stationary, but adjustable, mount for an engine block and to axially move a rotating boring bar into the engine. In practice, this has required complex and costly structures. Because of their structure, set-up time is often considerable, and there are certain boring operations on certain engines which cannot be performed by them. Still further, and perhaps most significantly, existing machines do not embody means for finally determining the accuracy of a boring operation since they lack an alignment reference.

Accordingly, it is the object of this invention to provide a simpler and less costly boring assembly, one which does not require elaborate fixtures for positioning a boring bar, and one which may be readily checked for accuracy.

SUMMARY OF THE INVENTION

In accordance with this invention, first and second columns are mounted at spaced positions on a machine table having vertical and horizontal machine ways, the columns being vertically aligned with the ways. A boring bar is supported for rotation on and between the columns and rotably driven at one end. The supports are axially aligned with the machine ways as is a table which is movable along the machine ways between columns. A vertically and laterally adjustable holding fixture supports an automotive engine block on the table, whereby align boring of bearing housings of a block is effected by the combination of rotation of the boring bar and movement of the table along the machine ways.

DETAILED DESCRIPTION OF THE DRAWINGS

Figure 1:
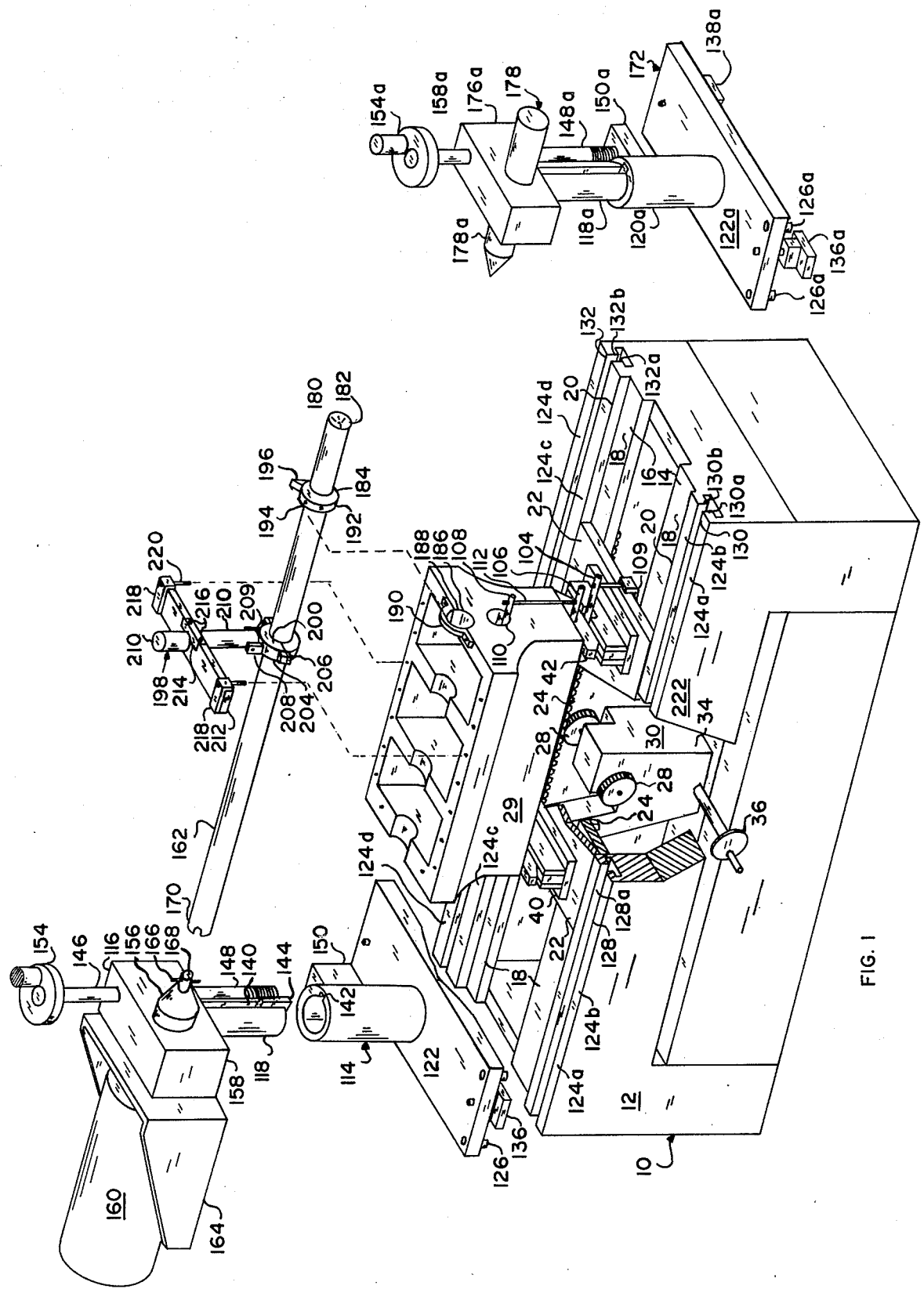
FIG. 1 is an exploded pictorial view of an embodiment of the invention.

Referring to FIG. 1, machine 10 includes base 12 which is a rectangular box-like structure generally open at the top. Base 12 incorporates a pair of spaced longitudinally extending L-shaped guide surfaces 14 and 16 individually formed of horizontal and vertical flatways 18 and 20, respectively. Carriage or table 22 is slidably supported by and between guide surfaces 14 and 16 and is thereby adapted to be moved along the guide surfaces. Longitudinally extending rack gears 24 are affixed to the underside of each horizontal flatway 18, and drive assembly 30 is attached to the underside of table 22 to effect controlled longitudinal movement of the table through driven pinion gears 28 in engagement with rack gears 24. Drive assembly 30 includes conventional gear reduction unit 34 which drives pinion gears 28, and is in turn driven by handle 36. Thus, when handle 36 is rotated in either direction, table 22 moves in a like direction. Additionally, drive assembly 30 would typically include a motor (not shown) which, through the just described linkage, would drive table 22.

An engine block to be bored is supported on table 22 by means of two identical support assemblies 40 and 42, each of which includes lateral adjustment assembly 44 and vertical adjustment assembly 46.

Figure 2:
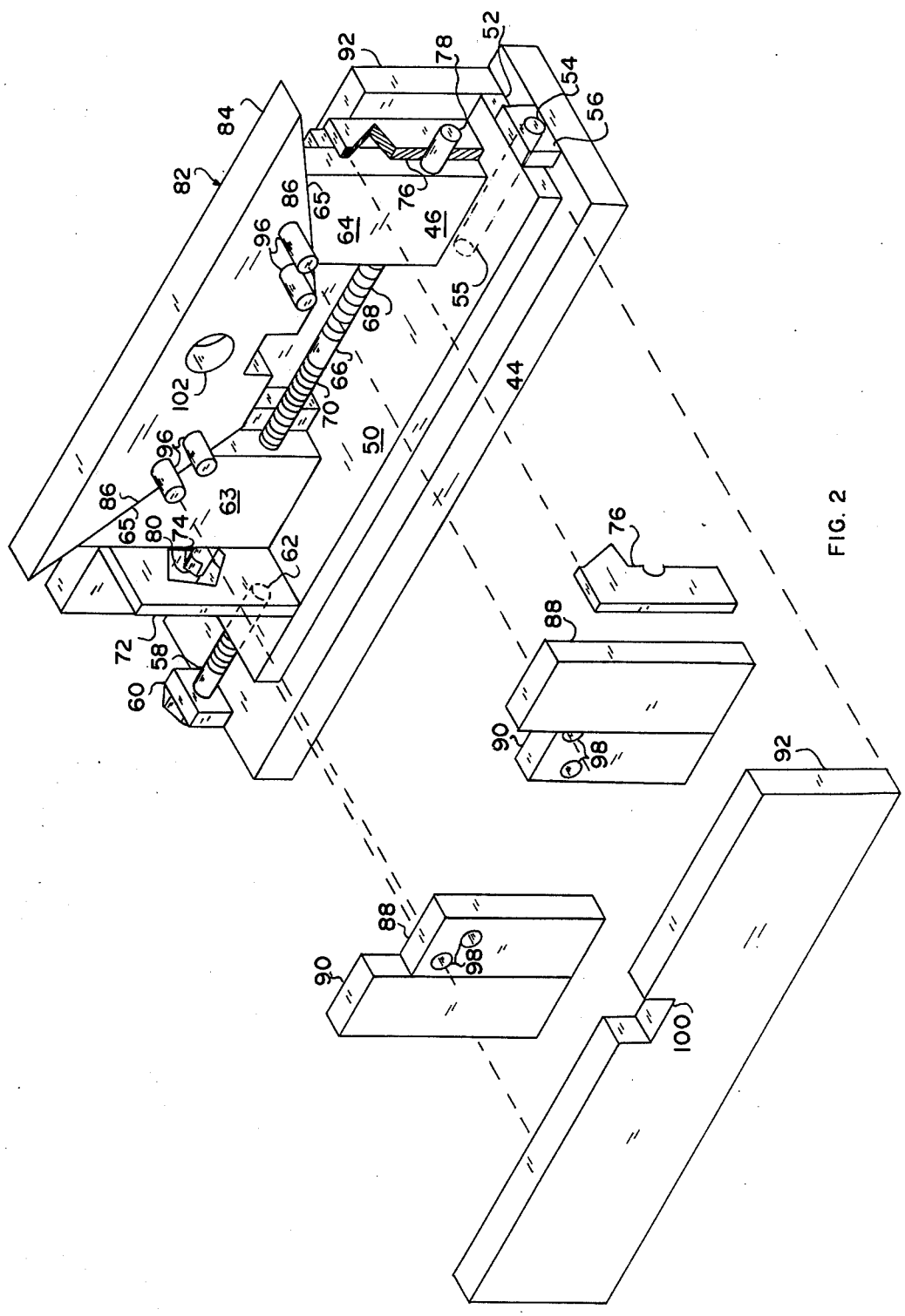
FIG. 2 is an exploded pictorial view of a block holding fixture.

FIG. 2 illustrates in detail one of the support assemblies. Rectangular plate 48, with its longest dimension extending laterally, provides a base for the support assembly, and it is initially positioned on table 22, as desired, as a coarse or rough adjustment, and when tightened to the table, it provides a firm base for lateral adjustment assembly 44. A smaller rectangular plate 50 provides a movable base for lateral adjustment assembly 44, and it is slidably mounted for transverse movement on plate 48, being secured and limited for such movement on side 52 by pin 54 extending into opening 55. Pin 54 is rigidly positioned by attachment block 56, which is in turn rigidly secured to plate 48. Plate 50 is further limited to transverse movement by shaft 58 which is axially secured by collar 60, which is in turn secured to plate 48 on the opposite side of plate 50. Additionally, shaft 58 includes a threaded portion 61 which engages threads in opening 62 of plate 50, and thus by hand rotation of shaft 58, plate 48 is transversely movable on plate 48.

Vertical adjustment assembly 46 includes wedge blocks 63 and 64 which slidably rest upon and extend vertically upward from plate 50. The upper portions of wedges 63 and 64 form separated but facing inclined planes 65. Vertical adjustment shaft 66 extends transversely through wedges 60 and 62 and includes left-hand threads 68 extending in one direction from its center and right-hand threads 70 extending in the other direction. Threads 68 and 70 engage mating female threads (not shown) in wedges 60 and 62. Vertical end plate 72 axially holds shaft 66 on end 74 for rotation, and vertical end plate 76 rotably holds shaft 66 on end 78. End 74 of shaft 66 extends through plate 72 and has wrench flat 80 by which shaft 66 may be rotated and thus draw together or extend apart wedges 63 and 64. Engine support 82 extends vertically upward from and in the plane of wedges 60 and 62. It is basically triangular, with its upper edge 84 (the contact surface) horizontal and the remaining two edges forming inclined planes 86 which rest upon and correspond to planes 65 of wedges 63 and 64.

As wedges 63 and 64 are moved apart or toward each other, they cause engine support 82 to either be raised or lowered by virtue of inclined planes 86 and 64. Guide blocks 88 and 90 are sandwiched between engine support 82 and vertical side members 92, which are rigidly affixed to and extend the length of plate 48, thus limiting movement of engine support 82 to a vertical plane. Guide blocks 90 are fastened to engine support 82 by pins 96 which extend through openings 98 of guides 90 to restrict transverse movement by support 82. Rectangular passage 100 and circular passage 102, in conjunction with three tubular horizontal bars 104, 106, and 108 (FIG. 1), are used to secure supports 40 and 42 to table 22, and in turn, engine block 29 to supports 40 and 42. Bar 104, passing through rectangular passage 100 of both supports 40 and 42, has each extended end secured to table 22 by L-shaped clamp assembly 109. Bar 106 extends from circular passage 102 in a like manner, and bar 108 extends parallel to bar 106 from cam shaft opening 110 in engine block 29. Hence, when the extended ends of bars 106 and 108 are drawn together by clamp assemblies 112, block 29 is held securely to supports 40 and 42.

Referring again to FIG. 1, and forming a drive end support assembly 114, bar drive assembly 116 is mounted on vertical tubular member 118, which is slidably mounted within tubular member 120, which is in turn mounted on flat plate 122. The underside of flat plate 122 rests upon flatways 124a–124d lying in a common plane and parallel to flatways 16 and 18. Plate 122 is longitudinally aligned by dowel pins 126 which contact vertical alignment wall 128 or 128a of T-slot 130, alignment walls 128 and 128a being parallel with vertical flatways 20. Alternately, dowel pins 126 may be positioned on the opposite end of plate 122 and insure longitudinal alignment by contact with alignment wall 132 or 132a of identical and parallel T-slot 134. Once plate 122 is so aligned, clamp bolt assemblies 136 and 138, by engagement in T-slots 130 and 134, respectively, rigidly secure plate 122 to flatways 124a–124d. To preserve horizontal alignment between an alignment wall of a T-slot and bar drive assembly 116, vertical key ways 140 and 142 are cut in tubular members 118 and 120, respectively, and the tubular members are angularly locked together by means of key 144. Precise height adjustment of drive assembly 116 is effected by screw assembly 146 consisting of threaded rod 148, which is axially locked in port block 150 of bar drive assembly 116 and threaded block 152 mounted on tubular member 120. Handle 154, attached to a top end of rod 148, provides convenient means of rotation of rod 148 for raising and lowering drive assembly 116.

Drive assembly 116 consists basically of drive center 156 mounted in bearings (not shown) in support block 158 and a motor drive assembly 160 which rotably drives center 156. Motor drive assembly 160 typically would include suitable speed reduction and speed control means to effect a desired rotational speed for center 156, depending upon the desired peripheral speed to be imparted to boring bar 162, as will be further explained. Motor drive assembly 160 is supported on mounting bracket 164 attached to support block 158. Rotational drive by center 156 to bar 162 is imparted by a diametrically positioned pin 166 through a shaft extension 168 of center 156 which mates with a correspondingly shaped slot in an otherwise conical slot in end 170 of boring bar 162.

An opposite end support assembly 172 is positioned on an opposite end region 174 of base 12 and is similar to end support assembly 114 which is identical in instances of components bearing identical numbers, but with a suffix "a". Block 176 is similar to block 158 of end assembly 114, but it supports only screw assembly 146a and live center assembly 178, a conventional device wherein center 178a is rotably supported in block 176a.

Boring bar 162 is pivotally mounted at end 180 by concave center 182 which mates with center 178a. Additionally, concave center 182 and center 172a could be drawn together by a threaded rod (not shown) extending through the axis of center 178a which would engage mating threads in boring bar 162. Boring bar 162 is held between center 178 and drive center 156 precisely parallel with vertical alignment walls 128 or 128a of T-slot 130 or 132, respectively, by virtue of the structure thus far described. It is held parallel with parallel flatways 124a–124d of base 12 by adjustment of screw assemblies 146 and 146a, as will be further described in connection with the description of the operation of the machine.

Tool assemblies 184, one or more, are positioned along bar 162 to effect the single or dual cutting of bearing housings 186 of block 29, as desired. Saddle bore 188, formed integrally of block 29, comprises one-half of bearing housings 186, and removable cap 190 comprises the other half. A single tool assembly would include collar 192 affixed to bar 162 by one or more set screws 194 and cutting tool 196 mounted in an opening in collar 192 and attached by a set screw (not shown). Alternately, cutting tools would be mounted at selected locations along bar 162 by tool stations drilled in bar 162 and essentially locked in place by locking screws.

A steady rest assembly 198 is adapted to attach to an engine block and provide, where needed, a stabilizing or steadying effect near the actual point of cutting. It employs a split type bushing 200 which is openable along lines 202, and thus readily positionable around bar 162 with the bar in place. Upper and lower split portions 204 are then attached together by a conventional locking connection 206. Mounting arms 208 and 209 mount bushing 200 on vertical rod 210 which is slidably positionable in cross bar 212 and lockable in position by locking clamp 214 by means of locking screws 216. Cross bar 212 is attached to block 29 by means of adjustably positionable clamps 218 which extend over cross bar 212 and by means of bolts 220 which thread into engine block 29.

To examine the operation of the machine, and with end support assemblies 114 and 172 in place and longitudinally aligned as described, work holding fixtures 40 and 42 are positioned at spaced locations on table 22 and vertical adjustment shaft 66 and lateral adjustment shaft 58 adjusted so that the adjustments are at mid points. As will be appreciated from FIG. 2, increased height is achieved by operating shaft 66 so that wedges 63 and 64 are drawn together, and decreased height is achieved by operation of shaft 66 in the opposite direction so that wedges 63 and 64 are moved apart. Rotation of shaft 58 causes lateral adjustment assembly 44 to be moved generally away from front side 222 of machine 10, and when operated in the opposite direction, lateral adjustment assembly 44 is moved toward front side 222. By examination, end supports 114 and 172 are adjusted equally vertically so that boring bar 162, when in position, would generally center within the bearing housings in order that desired cuts may be achieved. Next, ends 170 and 180 of boring bar 162 would be snugly positioned on centers 156 and 178.

Bars 106 and 108 and clamp assembly 112 are now used as previously explained to secure block 29 to engine support assemblies 40 and 42. Bar 104 and L-shaped clamp assembly 109 are positioned to secure engine support assemblies 40 and 42 to table 22, as previously explained, but are not tightened at this time.

Next, a dial indicator would be positioned generally on a top region of block 29 and oriented so that its sensing arm senses the bottom of bar 162 and table 122 moved back and forth by rotation of handle 36. Thus, in this fashion, it is determined what, if any, adjustments need to be made in the vertical positioning of either of engine support assemblies 40 and 42 to maintain bar 162 in a parallel horizontal plane to that of guide surfaces 18. With this adjustment made, and thus with bar 162 aligned with surfaces 14 and 16, the next step is to position engine block 29 in alignment with bar 162 so that one may bore along the original axial center of bearing housings. To do this, the dial indicator is attached to boring bar 162 so that its sensing container enters and touches the face of one of saddle bores 188. The bore is aligned with the bar when the indicator reads the same at three points in the block bore; and to effect this alignment, vertical adjustment shaft 66 of engine support assemblies 40 and 42 and lateral adjustment screws 58 of engine support assemblies 40 and 42 are adjusted. It is significant that one is only concerned with the block half of the bore, and the three points to be concerned with are each side of the bore right below the parting face of cap 190 and the point at the center distance between these two points which is normally in line with an oil hole in block 29. In each case, the saddle bores nearest the bar ends are the ones to be centered.

After the foregoing adjustments have been made, it is desired to vertically move both ends of the block up approximately 0.001 inch, as this will enable cutting tool 196 to be set at a proper size to clean up the block portion of the bore. However, it is critical that not much be removed from the saddle bore half of the housing as this will result in gear and chain problems with assembled engines. After this last adjustment has been made, holding bar 104 is finally locked in place by firm connection of clamp assemblies 109 and to each end of table 22.

Now, with all adjustments made and cutting tool 196 set in collar 192 to take a desired cut in boring housing 186, motor 160 is turned on and steady rest 198 mounted and secured to block 29 without a cut being taken. In this fashion, the bar is steadied to run in an aligned position, and thus cutting may be commenced. To accomplish this, handle 36 is rotated and through drive assembly 26 moves table 22, to in turn move a bearing housing into rotating cutter 196 and to effect the reboring of the bearing housing. After reboring one housing, the block may be continued in advancement, thereby allowing a second inline bearing housing 186 (cap not shown) to be bored without moving collar 192. The procedure may be continued to additional bearing housings, provided there is still sufficient travel left on the ways of the machine. When this is not the case, collar 192 would be tightened on bar 162 in a different location, whereby the bearing housings not bored may be bored. Thus, by the machine of this invention and the following procedure outlined, the boring housings may be align bored precisely and simply. By virtue of the fact that there are basic references, guide surfaces 16 and 18, which are vertical and horizontal references, the boring bar can be readily held to alignment and then the work piece moved along the same references. The result is the operator knows when his adjustments are right and can proceed with confidence in accuracy over long periods of usage of the machine. In the event that there should occur some misalignment by virtue of bearing or other component wear, the problem will be readily apparent and correction can be taken before use of the machine in the cutting operation. In this fashion, there would be no excuse for taking an incorrect cut or otherwise damaging an engine block.

Having thus described my invention, what is claimed is:

1. A boring machine for alignment boring of a plurality of bearing housings of an automotive engine block comprising:
   a horizontally elongated base having vertical and horizontal longitudinally extending machine ways;
   a first vertical adjustable-in-height column supported by one end region of said elongated base and in engagement and aligned with said machine ways, and a second vertical adjustable-in-height column supported on an opposite end region of said elongated base and in engagement and aligned with said machine ways;
   an elongated horizontal track on said base between said vertically extending columns, which track defines a longitudinal axis and horizontally reference plane in alignment with said vertical and horizontal machine ways;
   a table adapted to be supported by and be longitudinally movable along said track;
   feed means for selectively moving said table along said track;
   a boring bar;
   bearing support means for horizontally and rotably supporting ends of said boring bar on and between said columns and along a line in a first plane parallel with the plane of said vertical machine ways and coincident in a second plane parallel with the plane of said vertical machine ways;
   drive means coupled to one end of said boring bar for rotating said boring bar;
   engine block support means for adjustably, vertically and laterally, and rigidly supporting an engine block on said table with said boring bar through bearing housings with said bar concentrically positioned with respect to the center of a desired bore through said bearing housings; and
   at least one cutting tool mounted on said boring bar, whereby bearing housings of an engine block may be bored by moving said table longitudinally by operation of said feed means.

2. A boring machine as set forth in claim 1 wherein said vertical machine ways comprises a pair of spaced vertical slots in said base, and said horizontal ways comprises a top surface region of said base.

3. A boring machine as set forth in claim 2 wherein said bearing support means comprises a live center mounted on one of said vertical columns and providing an undriven support.

* * * * *